United States Patent
Yamazaki et al.

[11] Patent Number: 5,838,998
[45] Date of Patent: Nov. 17, 1998

[54] PHOTO FILM TAKE-UP SPOOL AND SHAFT

[75] Inventors: Takeshi Yamazaki; Syunji Kumamoto; Fumio Noji, all of Kanagawa, Japan

[73] Assignee: Fuji Photo Film Co., Ltd., Kanagawa-ken, Japan

[21] Appl. No.: 934,767

[22] Filed: Sep. 22, 1997

Related U.S. Application Data

[63] Continuation of Ser. No. 620,353, Mar. 22, 1996, abandoned.

[30] Foreign Application Priority Data

Mar. 24, 1995 [JP] Japan ................................. 7-066203

[51] Int. Cl.⁶ .................................................. G03B 17/02
[52] U.S. Cl. .............................. 396/6; 396/388; 396/411; 396/429; 396/538
[58] Field of Search ....................... 396/6, 387, 388, 396/411, 429, 538; 242/586, 586.2, 587.2, 587.3

[56] References Cited

U.S. PATENT DOCUMENTS

| | | | |
|---|---|---|---|
| 649,694 | 5/1900 | Hunter | 242/532.5 |
| 1,141,441 | 6/1915 | Campbell | 242/532.5 |
| 3,420,154 | 1/1969 | Lieser et al. | 396/387 |
| 4,161,298 | 7/1979 | Davis | 242/530.3 |
| 4,531,684 | 7/1985 | Mills | 242/532.5 |
| 4,832,275 | 5/1989 | Robertson | 242/71.1 |
| 4,884,087 | 11/1989 | Mochida et al. | 354/75 |
| 4,954,857 | 9/1990 | Mochida et al. | 354/75 |
| 4,984,751 | 1/1991 | Hoffacker et al. | 242/74 |
| 5,353,079 | 10/1994 | Sakai et al. | 354/149.11 |
| 5,487,513 | 1/1996 | Takahashi et al. | 242/348.1 |

FOREIGN PATENT DOCUMENTS

| | | |
|---|---|---|
| A10485957 | 5/1992 | European Pat. Off. . |
| 1135260 | 10/1962 | Germany . |
| A14233969 | 4/1993 | Germany . |
| 5204094 | 8/1993 | Japan . |
| 2237120 | 11/1990 | United Kingdom . |

*Primary Examiner*—Eddie C. Lee
*Attorney, Agent, or Firm*—Sughrue, Mion, Zinn, Macpeak & Seas, PLLC

[57] ABSTRACT

A take-up shaft is adapted to taking up photo film from a photo film cassette having the photo film, and particularly used in a lens-fitted photo film unit. The photo film cassette includes a cassette spool on which the photo film is wound in a roll form. A cassette shell contains the cassette spool in rotatable fashion. The take-up shaft has a shaft body (46, 53, 72, 81) having a substantially cylindrical shape. A nip device (47, 52, 73) is disposed inside the shaft body, and nips a leader (26b) in removable fashion. The shaft body is rotated with the leader, to wind the photo film in a roll form (26a). At least one curved face (46c, 53c, 57b, 62b, 64c, 72a, 81a) is formed between the inside of the shaft body and a cylindrical face of the shaft body and at a radius of curvature 0.4–0.85 time as long as a radius of the shaft body, and prevents the leader secured to the shaft body from being sharply bent.

6 Claims, 13 Drawing Sheets

F I G. 1
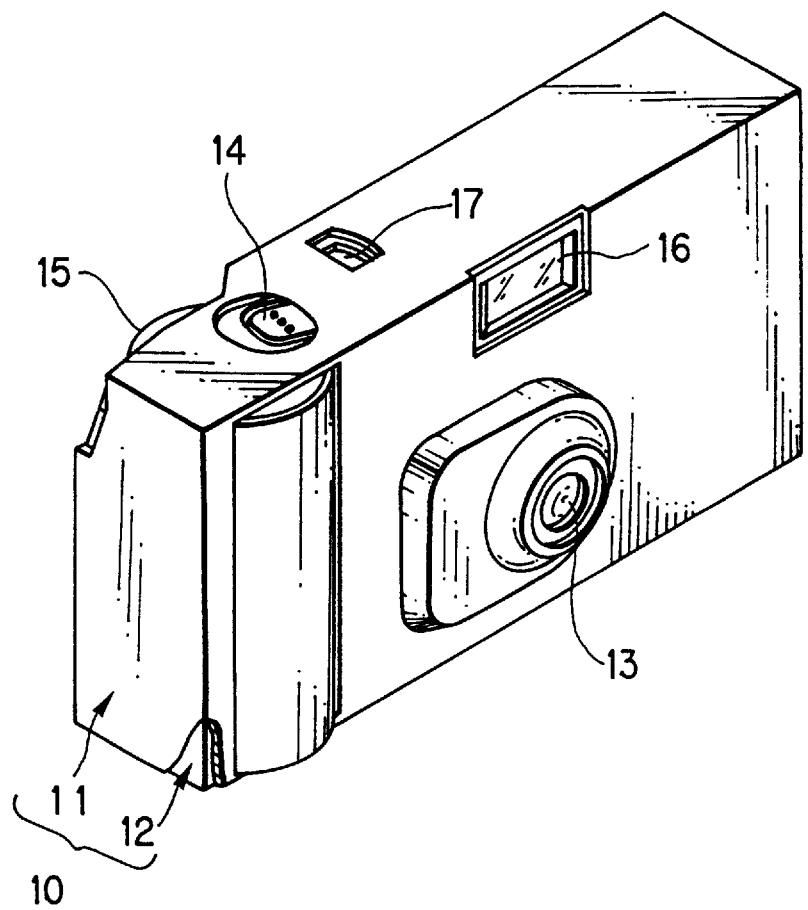

PHOTO FILM TAKE-UP SPOOL AND SHAFT

This is a Continuation of application Ser. No. 08/620,353 filed Mar. 22, 1996, now abandoned.

BACKGROUND OF THE INVENTION

1. Field of the Invention

The present invention relates to a photo film take-up spool and shaft. More particularly, the present invention relates to a photo film take-up spool and shaft for winding photo film to be used in a lens-fitted photo film unit.

2. Description Related to the Prior Art

A lens-fitted photo film unit is pre-loaded with unexposed photo film of a 135 type, and operable for taking exposures in a manner of a camera. The lens-fitted photo film unit includes a cassette containing chamber and a photo film roll chamber between which an exposure aperture is disposed. The cassette containing chamber contains a cassette shell of a photo film cassette. The roll chamber contains a roll of the unexposed photo film drawn from the cassette shell. Two types of lens-fitted photo film units are known: a two-spool type and a one-spool type. The two-spool type includes a cassette spool and also a take-up spool about which the roll is formed by winding the photo film. The one-spool type includes a cassette spool but not a take-up spool. An apparatus for producing products of the one-spool type includes a take-up shaft, about which a roll of photo film is formed by winding the photo film in a factory. The take-up shaft is moved into the roll chamber, places the roll, in the roll chamber and moved away from the roll chamber, to load the lens-fitted photo film unit with the roll of which the center does not have a spool.

U.S. Pat. No. 4,884,087 and 4,954,857 (corresponding to JP-A 64-544) discloses a photo film take-up shaft in which a take-up slot is formed longitudinally and openly at a distal end thereof. A pressing spring plate is disposed inside the take-up slot, to nip a leader of photo film between the spring plate and a confronted wall inside the take-up slot. The take-up shaft is rotated to wind the photo film in a roll form thereabout. JP-A 5-204094 discloses a photo film take-up spool in which a take-up slot is formed longitudinally. Hooks are formed on the inside of the take-up slot. Perforations are formed in a leader of photo film, and engaged with the hooks. The take-up spool is rotated to wind the photo film thereabout.

In a lens-fitted photo film unit, photo film is moved into a cassette as much as one frame each time an exposure is taken. When a final frame is exposed, the photo film is wound to include the entirety of the photo film having the leader into the cassette. If the lens-fitted photo film unit is a two-spool type, the leader is smoothly detached from the take-up spool after the exposure on the final frame. The lens-fitted photo film unit is forwarded to a photo laboratory, where the cassette is removed. The photo film as exposed is removed from the cassette, and is developed and subjected to printing, by techniques known in the field of the photo finishing.

U.S. Pat. No. 4,832,275 discloses a photo film cassette in which a leader of photo film is pre-contained entirely in a cassette shell and rotation of a spool in an unwinding direction causes the leader to advance to an outside. The photo film contained in this includes a support and an emulsion layer formed thereon. The support is formed of annealed polyethylene naphthalate (A-PEN) having great rigidity and advantage of great easiness in advancement of the photo film. The photo film has the leader, an effective exposure area and a trailer. In the effective exposure area, two perforations are associated with each of frames. No perforation is formed in the leader or the trailer.

However the take-up spool or shaft disclosed in JP-A 5-204094, having the hooks for engagement with perforations in the leader of the photo film, cannot be used with the photo film in which no perforation is formed in the leader.

The take-up shaft disclosed U.S. Pat. No. 4,884,087 and 4,954,857 (corresponding to JP-A 64-544) is usable in fashion irrespective of existence of perforations. However a shortcoming lies in that an irrecoverable fold is inevitably formed in the photo film leader in an edge position between the take-up slot and a cylindrical face of the spool core. Once folded, the highly rigid photo film cannot recover its original condition without the fold. If the suggestion of U.S. Pat. No. 4,884,087 and 4,954,857 (corresponding to JP-A 64-544) is combined with a leader-advancing cassette, a problem still remains: the leader of the photo film cannot be advanced to the outside of a cassette shell due to the fold, even when the spool is rotated in an unwinding direction when treating the photo film cassette in a photo laboratory.

JP-A 61-156033 discloses a spool which is used for photo film and in which an edge of an entrance of a take-up slot formed through a spool core is rounded off by way of a curved face with a radius of curvature nearly 1/3 time as long as a radius of the core for the photo film. This curved face can prevent the leader from having a fold. However the inclined face is likely to cause the leader to have an irrecoverable curl. Once curled, the highly rigid photo film cannot recover its original condition without the curl. If the suggestion of JP-A 61-156033 is combined with a leader-advancing cassette, the problem still remains: the leader of the photo film cannot be advanced to the outside of a cassette shell due to the curl, even when the spool is rotated in an unwinding direction.

SUMMARY OF THE INVENTION

In view of the foregoing problems, an object of the present invention is to provide a photo film take-up spool and shaft for winding photo film safely without creating irrecoverable folds or curl in a leader of the photo film.

In order to achieve the above and other objects and advantages of this invention, a take-up spool has a core having a substantially cylindrical shape. A nip device is disposed inside the core, for nipping a leader of photo film in removable fashion. At least one curved face is formed between the inside of the core and a cylindrical face of the core and at a radius of curvature 0.4–0.85 time as long as a radius of the core, for preventing the leader secured to the core from being sharply bent.

The take-up spool is incorporated in a lens-fitted photo film unit. The take-up spool is disposed in a roll chamber in rotatable fashion. The photo film is drawn from a cassette. The leader of the photo film is secured to the take-up spool about which the photo film is wound in a form of a photo film roll.

In a preferred embodiment, a take-up slot is formed in the core, for receiving insertion of the leader. The curved face is formed in connection to at least one of two walls of the take-up slot.

The nip device is confronted with one wall of the two walls of the take-up slot, and presses the leader inside the take-up slot against the one wall.

In a variant, first and second core halves are defined by the take-up slot splitting the core, and comprise the nip device.

For another type of lens-fitted photo film unit, a take-up shaft for production of the lens-fitted photo film unit includes a shaft body having a substantially cylindrical shape. A nip device is disposed inside the shaft body, for nipping a leader of photo film in removable fashion. At least one curved face is formed between the inside of the shaft body and a cylindrical face of the shaft body and at a radius of curvature 0.4–0.85 time as long as a radius of the shaft body, for preventing the leader secured to the shaft body from being sharply bent.

The leader of the photo film is secured to the take-up shaft which is rotated to wind the photo film thereabout in a form of a photo film roll. The take-up shaft is inserted in the roll chamber to insert the photo film roll.

In a preferred embodiment, a take-up slot is formed in the shaft body, for receiving insertion of the leader. The take-up slot has first and second walls, and the curved face is formed in connection to at least the first wall of the take-up slot.

The take-up slot is formed openly in a distal end of the shaft body, and after inserting the photo film roll, the shaft body is moved away from the roll chamber in an axial direction, and detached from the photo film roll in the roll chamber. The nip device is confronted with the first or second wall of the take-up slot, and presses the leader inside the take-up slot against the first or second wall.

In the present invention, the photo film can be wound on a photo film take-up spool and shaft safely without creating irrecoverable folds or curl in the leader of the photo film.

BRIEF DESCRIPTION OF THE DRAWINGS

The above objects and advantages of the present invention will become more apparent from the following detailed description when read in connection with the accompanying drawings, in which:

FIG. 1 is a perspective illustrating a lens-fitted photo film unit;

DETAILED DESCRIPTION OF THE PREFERRED EMBODIMENT(S) OF THE PRESENT INVENTION

Figure 2:
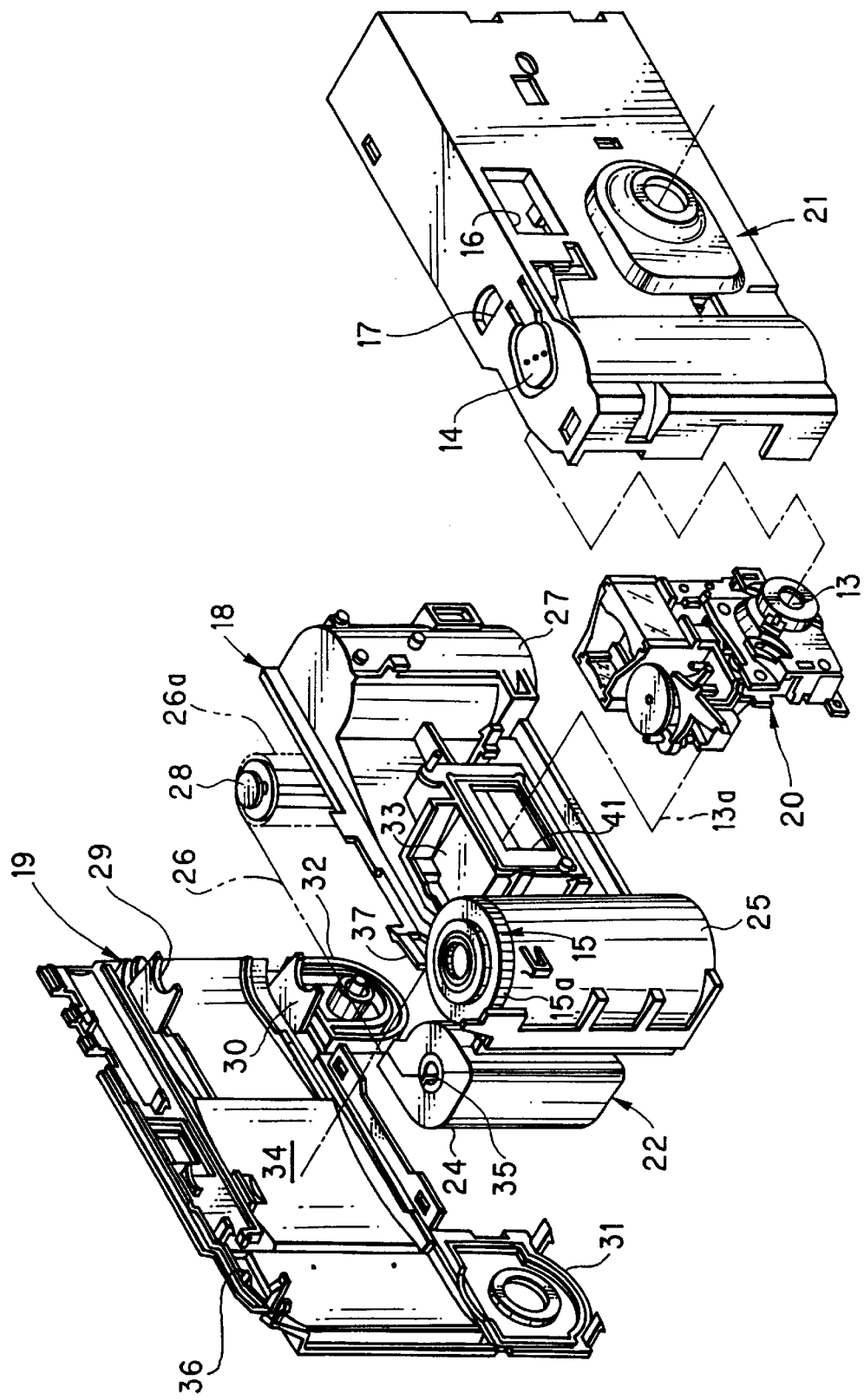
FIG. 2 is an exploded perspective illustrating the lens-fitted photo film unit.

In FIG. 1, a lens-fitted photo film unit 10 includes a cardboard packaging 11 and a photo film housing 12. The cardboard packaging 11 has openings through which there appear a taking lens 13, a shutter release button 14, a winder wheel 15, a viewfinder window 16, a frame counter window 17, and the like.

The photo film housing 12 includes a photo film containing section 18, a rear cover 19, an exposure section 20, and a front cover 21, as illustrated in FIG. 2.

In front of the photo film containing section 18, the exposure section 20 is secured in removable fashion. The exposure section 20 has an exposure mechanism as a shutter, the taking lens 13, a photo film winding/wind-stop mechanism, a shutter charge mechanism and the like, all of which are assembled as a single unit. The rear cover 19 is secured to the rear of the photo film containing section 18 in removable fashion, so that the exposure section 20 contains photo film 22 between it and the photo film containing section 18.

The front cover 21 is secured to the front of the photo film containing section 18 in removable fashion. The shutter release button 14 is defined by cutting a three-sided slit in a top of the front cover 21.

The photo film containing section 18 includes a cassette containing chamber 25 and a photo film roll chamber 27. The cassette containing chamber 25 contains a cassette shell 24 of a photo film cassette. The roll chamber 27 contains a roll 26a of unexposed photo film 26 drawn from the cassette shell 24. The roll 26a is formed by winding the photo film 26 about a take-up spool 28. Top and bottom ends of the take-up spool 28 are is supported by two forks 29 and 30 of the rear cover 19 in rotatable fashion.

Bottoms of the cassette containing chamber 25 and the roll chamber 27 have openings, which are closed by bottom lids 31 and 32 formed with the rear cover 19 after loading of the photo film 22.

There is formed an exposure tunnel 33 between the cassette containing chamber 25 and the roll chamber 27. The rear of the exposure tunnel 33 has an exposure aperture 23 (See FIG. 4), which has a curvature of an arc which a center lies on an optical axis 13a at the center of the taking lens 13. A photo film support face 34 is formed on the rear cover 19 to confront with a back face of the photo film 22, and has a curvature similar to the photo film 22 and the exposure aperture 23. Note that it is possible to form the exposure tunnel 33 with the exposure section 20. It is alternatively possible to split the exposure tunnel 33 into front and rear portions, to provide the exposure section 20 with the front portion and to provide the photo film containing section 18 with the rear portion, so that the exposure tunnel 33 is formed when the exposure section 20 is secured to the photo film containing section 18.

The front of the exposure tunnel 33 has an opening 41 through which light from a photographic subject is passed from the taking lens 13 toward the exposure aperture 23.

The winder wheel 15 is disposed on the top of the cassette containing chamber 25 in rotatable fashion, and engaged with a cassette spool 35 in the cassette shell 24 inserted in the cassette containing chamber 25. The winder wheel 15 partially emerges through an opening formed in the rear cover 19. When the outside portion of the winder wheel 15 is rotated in the counterclockwise direction to wind the photo film, the cassette spool 35 is rotated to wind the photo film 26 into the cassette shell 24.

A periphery of the winder wheel 15 has regularly formed teeth 15a. A one-directional claw 37 formed with the photo film containing section 18 is engaged with the teeth 15a. The one-directional claw 37 hinders the winder wheel 15 from rotating clockwise, namely in reverse to winding the photo film.

The exposure section 20 includes the exposure mechanism as shutter, the photo film wind stop mechanism, the shutter charge mechanism, and also a photo film counter mechanism.

Those mechanisms are actuated by rotation of a two-toothed sprocket wheel having two teeth which are successively engaged with each two of perforations 39 and 40 between which a shorter interval is defined in the photo film. The sprocket wheel makes one rotation by one-frame feeding of the photo film. Rotation of the sprocket wheel causes the shutter charge mechanism to charge a shutter, and causes the photo film counter mechanism to count frames of the photo film. When the photo film is moved by one frame, the photo film wind stop mechanism is shifted to retain the sprocket wheel and the teeth about the winder wheel 15, so that the winder wheel 15 stops being rotated. Upon depression of the frame counter window 17, the exposure mechanism is actuated. Then the wind stop mechanism is released from the wind stopping.

Figure 3:
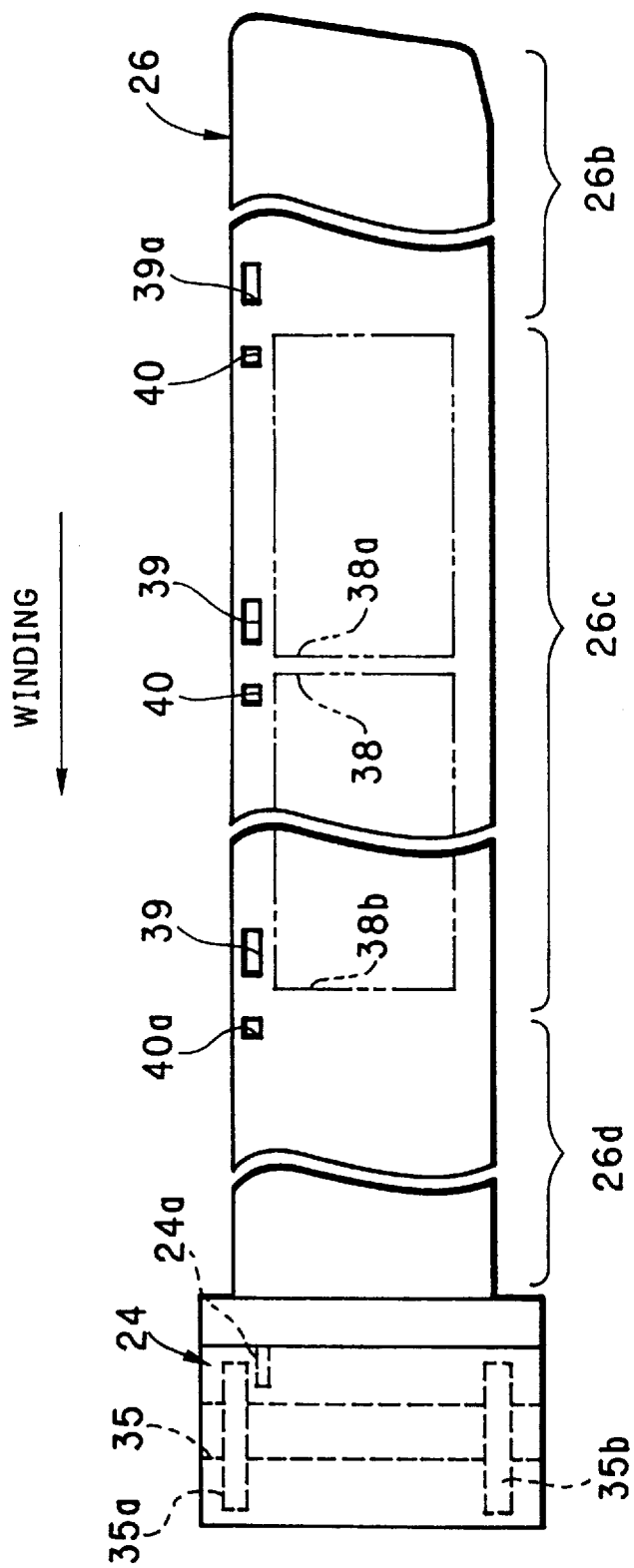
FIG. 3 is an explanatory view illustrating a photo film cassette and a photo film thereof.

The photo film 26 has a leader 26b, an effective exposure area 26c and a trailer 26d as illustrated in FIG. 3. The trailer 26d is retained on the cassette spool 35. The leader 26b and the trailer 26d are unusable for exposure in contrast with the effective exposure area 26c. Greater perforations 39 and smaller perforations 40 are formed in the photo film 26 along one edge of the effective exposure area 26c, and arranged at two intervals which are alternately repeated. The center of the longer interval between one greater and one smaller perforations 39 and 40 is located directly above the optical axis 13a, to set one of frames 38 to be exposed. To form the two-size-perforated strip of the photo film 26, a one-size-perforated photo film, for use in a widely available camera and having only perforations as large as the smaller perforations 40, is worked. To be precise, the one-size-perforated photo film, produced in a first line, is conveyed through a second line. The one-size-perforated photo film is punched at one of every two perforations included in each pair, to enlarge the one perforation, thereby to obtain the photo film 26.

Reference numeral 38a designates a frame near to the leader 26b and usable finally in the lens-fitted photo film unit 10. In working the photo film 26, a perforation 39a next to the leader-side frame 38a is enlarged. Reference numeral 38b designates a frame near to the trailer 26d and usable initially in the lens-fitted photo film unit 10. Another perforation 40a next to the trailer-side frame 38b is formed at the smaller size. As a result, any one of all the perforations has an associated mated perforation arranged at the short interval.

In the photo film 26, each of the greater perforations 39 is disposed in a top corner of one of the frames 38 and nearer to the trailer 26d. The greater perforations 39 are respectively longer than the smaller perforations 40 in the photo film longitudinal direction. Each of the smaller perforations 40 is disposed in a top corner of one of the frames 38 and nearer to the leader 26b. The greater perforations 39 have respectively as wide as the smaller perforations 40 in the photo film width direction.

The cassette shell 24 is constructed to respond to rotation of the cassette spool 35 in an unwinding direction of the photo film 26, to advance the leader 26b of the photo film 26 to the outside of the cassette shell 24. A leader-advancing structure of the cassette shell 24 includes spool flanges 35a and 35b and a separator claw 24a. The spool flanges 35a and 35b have respective ring-like lips, and are secured to respective distal ends of the cassette spool 35. The separator claw 24a is abutted on a distal end of the leader 26b as an outermost turn of the photo film 26 about the cassette spool 35, and directs it toward the outside of the cassette shell 24. The separator claw 24a is disposed on the inside of the cassette shell 24. The ring-like lips of the spool flanges 35a and 35b cover the outermost turn of the photo film 26 about the cassette spool 35, and transmit the rotation of the cassette spool 35 to the leader 26b.

The photo film 26 includes a support and an emulsion layer formed thereon. The support is formed of annealed polyethylene naphthalate (A-PEN) having great rigidity and advantage of great easiness in advancement of the photo film 26. The present invention is of course applicable to the photo film 26 having a support formed of polyethylene terephthalate or triacetyl cellulose (TAC).

Figure 4:
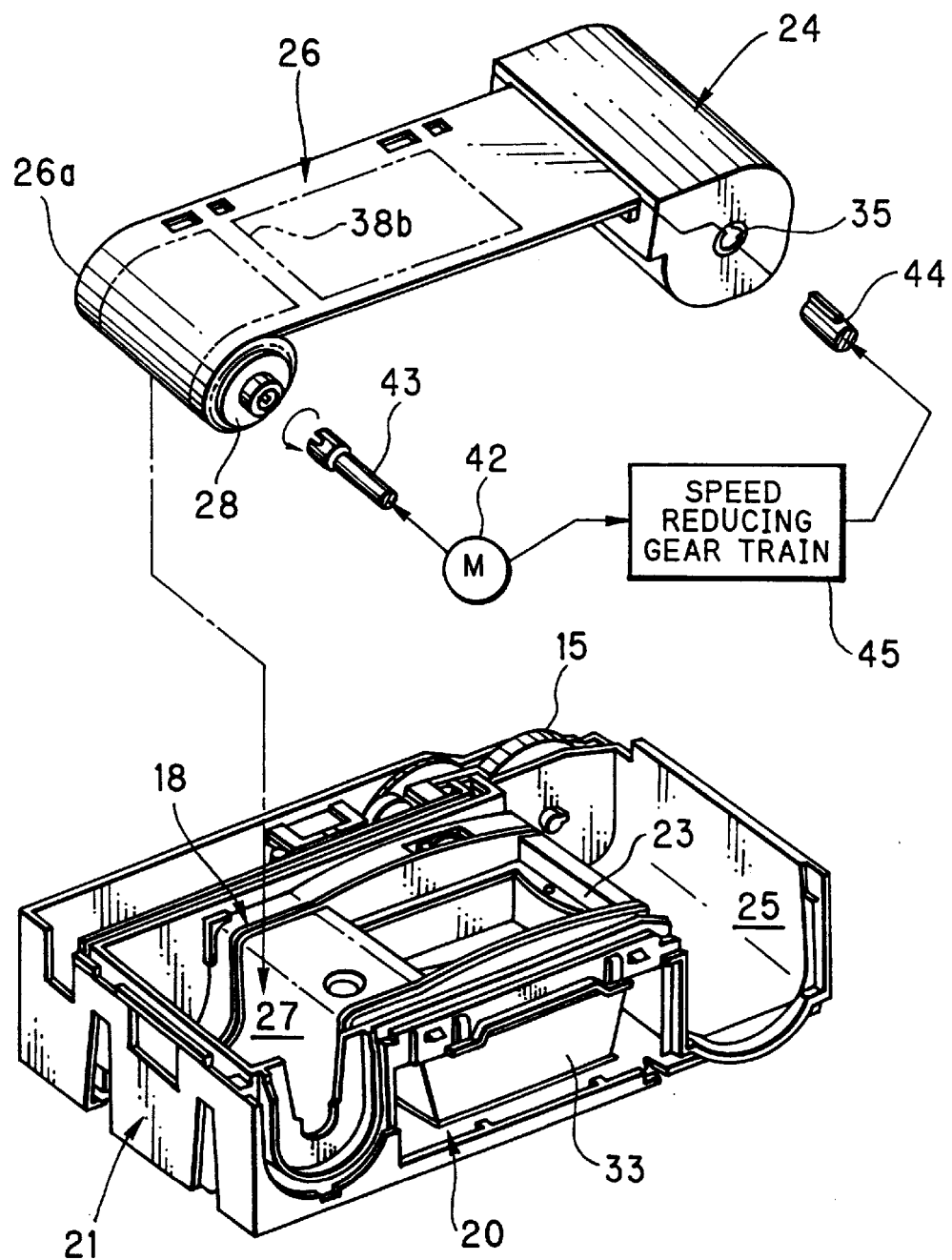
FIG. 4 is a perspective illustrating operation of producing a photo film roll.

In a factory to produce the lens-fitted photo film unit, the roll 26a is formed while drawing the photo film 26 from the cassette shell 24 to such an extent that a portion of the photo film 26 lying between the trailer-side frame 38b and an exit port of the cassette shell 24 has a length equal to or smaller than a length of the trailer-side frame 38b. As illustrated in FIG. 4, the exposure aperture 23 has a status shortly prior to setting the trailer-side frame 38b of the photo film 26.

To produce the roll 26a, a drive shaft 43 and a speed reducing shaft 44 are used. The drive shaft 43 is engaged with the take-up spool 28, and caused by rotation of a motor 42 to rotate the take-up spool 28. The speed reducing shaft 44 is engaged with, and rotates, the cassette spool 35. Rotation of the motor 42 is transmitted by a speed reducing gear train 45 to the speed reducing shaft 44. The drive shaft 43 is driven at high speed, to produce the roll 26a about the take-up spool 28 while tightening turns of the roll 26a.

Figure 5:
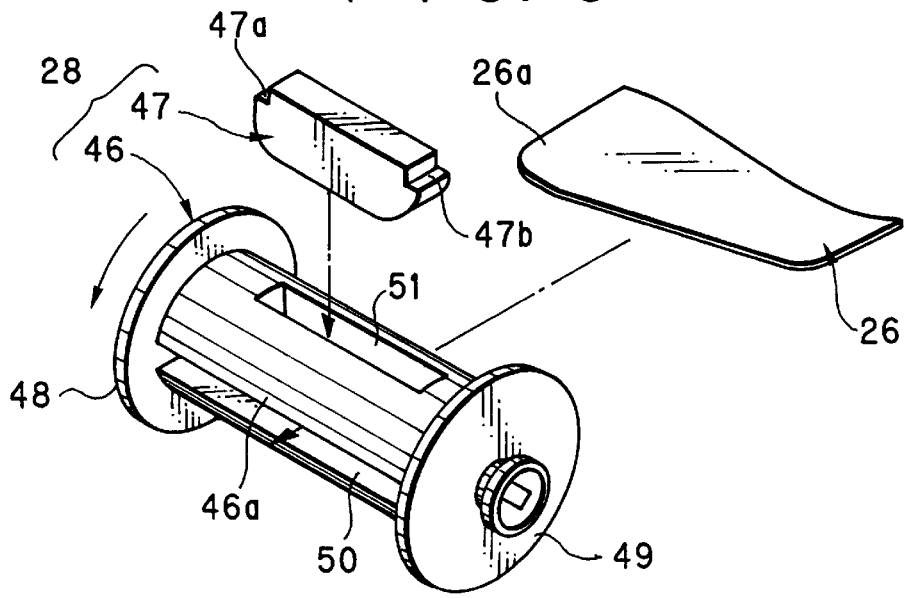
FIG. 5 is an exploded perspective illustrating a photo film take-up spool incorporated in the lens-fitted photo film unit.
Figure 6:
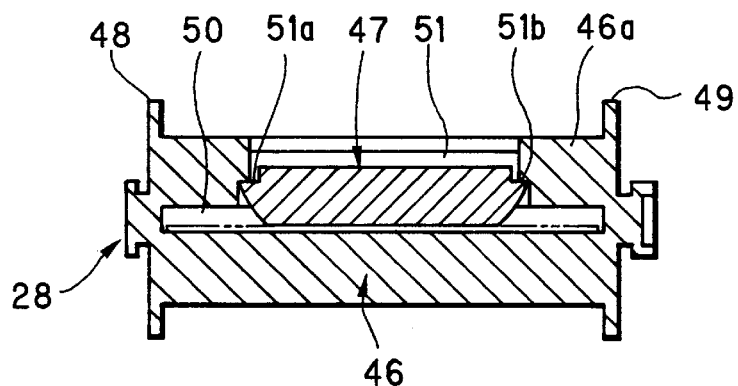
FIG. 6 is a longitudinal section illustrating the same take-up spool.
Figure 7:
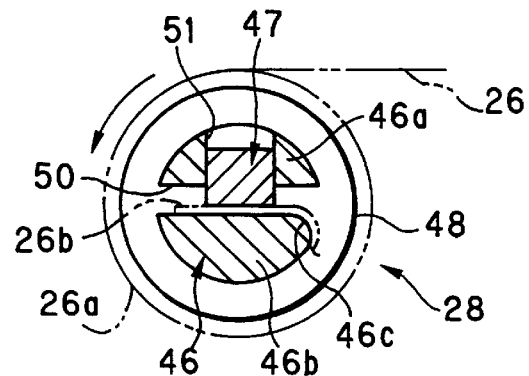
FIG. 7 is a cross section illustrating the same take-up spool.

The take-up spool 28 includes a core 46 and a nip member 47 as illustrated in FIGS. 5–7. Both of those are formed of resilient plastic material. The core 46 has spool flanges 48 and 49 formed at its respective distal ends. There is a take-up slot 50 formed to come through the core 46 between the spool flanges 48 and 49.

One core half 46a included in the core 46 has an auxiliary slot 51, as auxiliary opening, coming through the core half 46a and communicating to the take-up slot 50. The nip member 47 is inserted in the auxiliary slot 51 after insertion of the leader 26b into the take-up slot 50. Stoppers 51a and 51b in the auxiliary slot 51 are engaged with claws 47a and 47b of the nip member 47, to retain the nip member 47 fixedly. Fixation of the nip member 47 nips the leader 26b between the nip member 47 and a wall of the take-up slot 50. The force of nipping the leader 26b is so limited that, when a final exposure is taken, the leader 26b is detached from the nip member 47 by operation of winding the photo film 26.

It is preferable that the core 46 of the take-up spool 28 has a diameter of 11 mm. Should it be less than 11 mm, the photo film 26 would have nearly irrecoverable curl. Should it be more than 11 mm, the photo film 26 could not be contained in the roll chamber 27. When the photo film 26 has a length sufficient for taking 40 exposures, the photo film 26 is wound about the core 46 to become the roll 26a having a diameter of approximately 18 mm. Thus the roll 26a can be included in the roll chamber 27.

The take-up spool 28 is rotated in the arrow direction indicated in FIG. 7. A core half 46b included in the core 46 has an edge rounded off by forming a curved face 46c, which prevents the leader 26b from having irrecoverable curl or inextinguishable folds. The curved face 46c has a radius of curvature 0.4–0.85 time as long as a radius of the core 46 for the photo film 26. It is to be noted that all of four edges defined by the take-up slot 50 in a direction of the width of the photo film can be rounded off by way of the curved face 46c. It is also possible to define the curved face 46c in a shape of a portion of an ellipse, or in a shape of plural curves in combination. With any definition, the curved face 46c should have an approximated radius of curvature within the above range.

Operation of the above construction is described. In the factory, the exposure section 20 is produced by assemblage at first. The exposure section 20 is secured to the photo film containing section 18, to which the front cover 21 is secured. Then the photo film containing section 18 with those is transferred into a dark room, in the status of FIG. 4. The photo film containing section 18 in the dark room is subjected to operation of loading with the photo film 22.

In operation of the loading, the photo film 26 is drawn from the cassette shell 24, to produce the roll 26a. A dark room is used for shielding ambient light. It is easy to automate the operation by use of the drive shaft 43 and the speed reducing shaft 44.

The speed reducing shaft 44 is engaged with the cassette spool 35 in the cassette shell 24, for the motor 42 to rotate the cassette spool 35 in the unwinding direction. In a position to which the photo film 26 is directed, the core 46 stands by with the take-up slot 50 directed along a path of the leader 26b to be unwound. The leader 26b is smoothly inserted into the take-up slot 50 in the core 46. The advancement of the leader 26b is finished upon stop of the motor 42, in a position short of passing beyond the take-up slot 50.

Then the nip member 47 is inserted into the auxiliary slot 51 in the core 46 in the deepest fashion. The nip member 47 is fixed inside the auxiliary slot 51 by claw engagement. The leader 26b is nipped between the nip member 47 and the wall of the take-up slot 50.

Then the drive shaft 43 is engaged with the take-up spool 28. The motor 42 is driven again,to form the roll 26a about the take-up spool 28. The speed reducing shaft 44 in the rotation has the reduced speed, so the turns of the roll 26a are tightly wound on the take-up spool 28. The form of the curved face 46c is effective in preventing the leader 26b from having irrecoverable curl or inextinguishable folds even with the tightness of the turns.

To detect an amount of drawing the photo film 26, it is possible that a sensor such as an encoder associated with rotation of photo film detects movement of the photo film 26, and that a sensor counts the perforations 39 and 40 as moved past it. The motor 42 is stopped as soon as the photo film 26 is drawn at such an amount that a portion of the photo film 26 lying between the trailer-side frame 38b and the exit port of the cassette shell 24 has a length equal to or smaller than the length of the trailer-side frame 38b.

The roll 26a is inserted into the roll chamber 27 with the take-up spool 28. The cassette shell 24 is inserted into the cassette containing chamber 25. The rotational position of the sprocket wheel above the exposure aperture 23 is adjusted for its toothless arc portion to confront with the photo film in such fashion that a photo film portion between the cassette shell 24 and the roll 26a does not interfere with sprocket teeth. After loading of the photo film 22, the drive shaft 43 and the speed reducing shaft 44 are disabled in disconnection. The rear cover 19 is mounted to cover the photo film 22, which is now contained in light-tight fashion. Then the photo film housing 12 is fitted about the photo film housing to obtain the lens-fitted photo film unit 10, which is shipped out from the factory. It is to be noted that operation of forming the roll 26a can be effected inside the roll chamber 27. With this variant operation, the cassette shell 24 may be contained in the cassette containing chamber 25 while the roll 26a is formed.

Prior to initial advancement of the photo film 26, the trailer-side frame 38b is positioned shortly before the exposure aperture 23. A user operates the winder wheel 15 for the initial advancement. Rotation of the winder wheel 15 at a small amount moves the photo film 26 toward the cassette shell 24. The perforations 39 and 40 in the photo film 26 are engaged with the sprocket wheel, to actuate the wind stop mechanism. Then the trailer-side frame 38b is set at the exposure aperture 23, while the shutter charge mechanism and the counter mechanism are operated.

The depression of the shutter release button 14 actuates the exposure mechanism, to take an exposure on the trailer-side frame 38b. The wind stop mechanism has been released from the wind stopping. It is possible to effect the one-frame feeding of the photo film.

Exposures are taken in repetition of the operation, to move the photo film 26 further toward the inside of the cassette shell 24. When the leader-side frame 38a of the photo film 26 is exposed, the wind stop mechanism and the counter mechanism are disabled with the shutter charge mechanism kept in a charge status.

Then the sprocket wheel becomes freely rotatable. The winder wheel 15 is operable for consecutive rotation. Even when the greater perforation 39a associated with the leader-side frame 38a comes, the wind stop mechanism does not operate. No exposure is taken after the effective exposure area 26c. The leader 26b nipped by the take-up spool 28 can be removed smoothly by the force of the photo film winding. All the photo film 26 can be included into the cassette shell 24.

The lens-fitted photo film unit 10 is forwarded to a photo laboratory, where the bottom lid 31 of the rear cover 19 is opened to remove the cassette shell 24. The cassette spool 35 is rotated in the unwinding direction, to advance the leader 26b to the outside of the cassette shell 24. The photo film 26 as exposed is developed and subjected to printing, by techniques known in the field of the photo finishing. Thereafter the user is supplied with photographic prints and receives return of the photo film 26 as developed. The lens-fitted photo film unit 10 as emptied is withdrawn to a factory, and recycled.

Figure 7A:
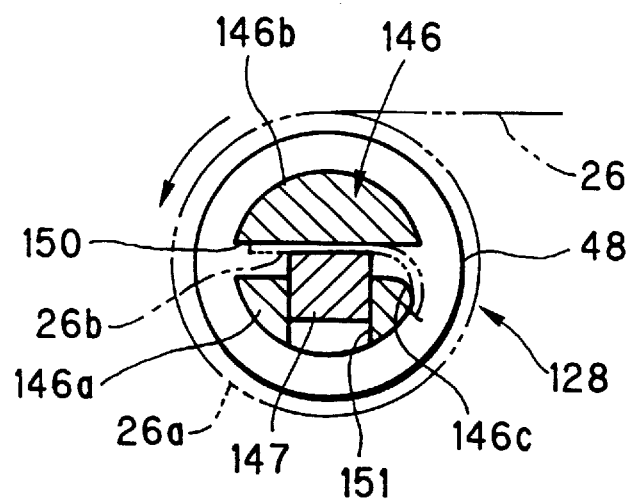
FIG. 7A is a cross section illustrating a variant take-up spool.

In the above embodiment, the curved face 46c is located on the core half 46b opposite to the core half 46a having the nip member 47. Alternatively it is possible as illustrated in FIG. 7A to form a curved face 146c on a core half 146a where a nip member 147 is mounted. A reference numeral 128 designates a take-up spool, 146 a core, 146b a core half, 150 a take-up slot, and 151 an auxiliary slot.

Figure 8:
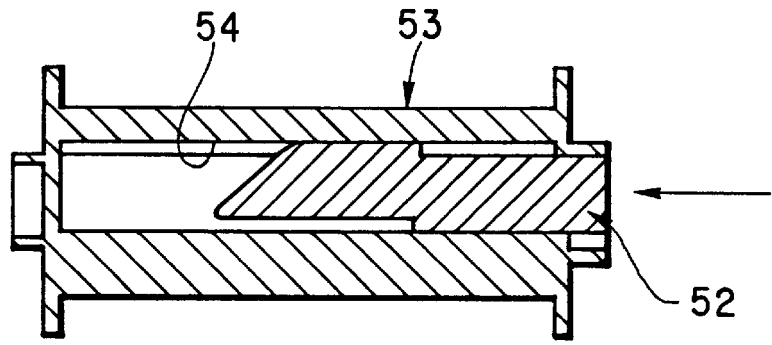
FIG. 8 is a longitudinal section illustrating another preferred take-up spool into which a nip member is axially inserted.
Figure 9:
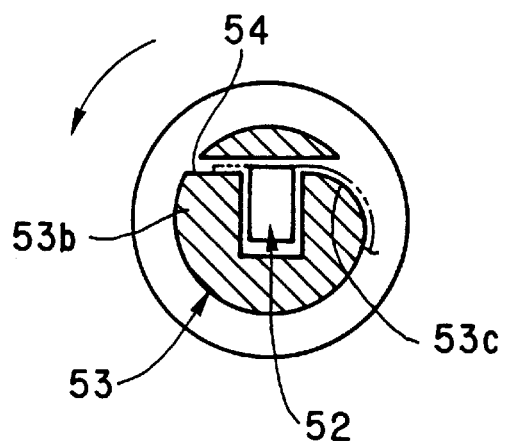
FIG. 9 is a cross section illustrating the same take-up spool.

In the take-up spool 28 of the above embodiment, the nip member 47 is inserted into the core 46 vertically to an axis of the core 46, to nip the leader 26b. It is also possible in FIGS. 8 and 9 to nip the leader 26b by inserting a nip member 52 into an auxiliary opening in an axial direction of a core 53. In this take-up spool, a take-up slot 54 is formed in an eccentric position relative to the core 53. A greater core half 53b has a curved face 53c. This is advantageous that the curved face 53c can be formed at a somewhat great diameter due to the association with the greater core half 53b.

Figures 10A, 10B:
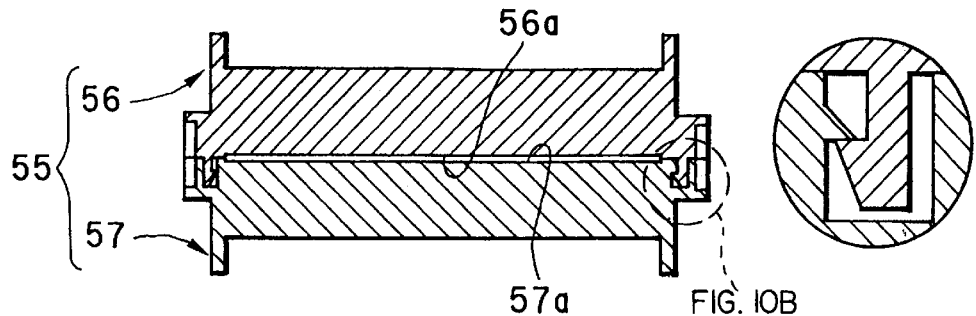
FIG. 10 is a longitudinal section illustrating a take-up spool consisting of two core halves.
Figure 11:
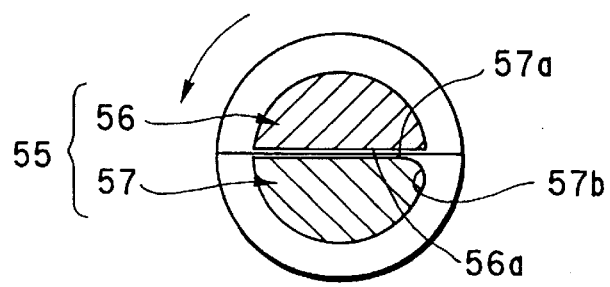
FIG. 11 is a cross section illustrating the same take-up spool.

In FIGS. 10 and 11, a take-up spool 55 is constituted by spool halves 56 and 57 split axially with reference to a diameter. As depicted in enlargement, hooks are formed on the spool halves 56 and 57, and engaged with one another to retain the spool half 56 on the spool half 57. In the retention of the spool halves 56 and 57, a narrow take-up slot is formed between a pair of confronted walls 56a and 57a at a narrow size smaller than thickness of the photo film 26, so that the leader 26b is nipped between the confronted walls 56a and 57a. A curved face 57b is formed by rounding off an edge of the confronted wall 57a, for receiving the photo film 26 with gentle curvature in rotation of the take-up spool 55.

Figure 12:
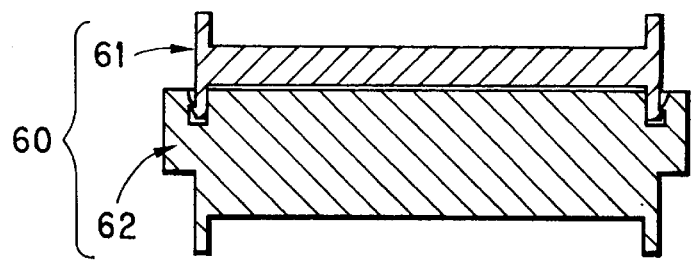
FIG. 12 is a longitudinal section illustrating a take-up spool in which a take-up slot is eccentric.
Figure 13:
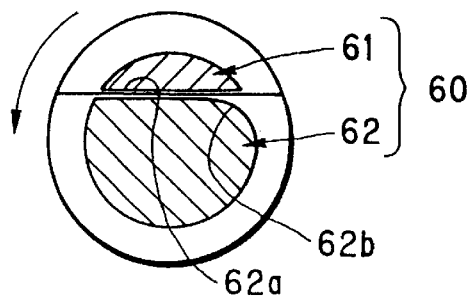
FIG. 13 is a cross section illustrating the same take-up spool.

In FIGS. 12 and 13, a take-up spool 60 has a core which is split into a smaller core half 61 and a greater core half 62 in an eccentric shape. There is a curved face 62b formed on the greater core half 62 and next to a confronted wall 62a as a take-up slot.

Figure 14:
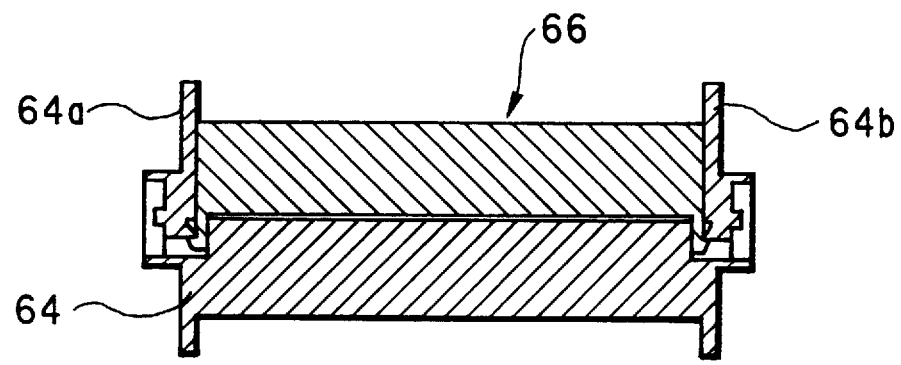
FIG. 14 is a longitudinal section illustrating a take-up spool in which spool flanges are formed exclusively with one of two core halves.
Figure 15:
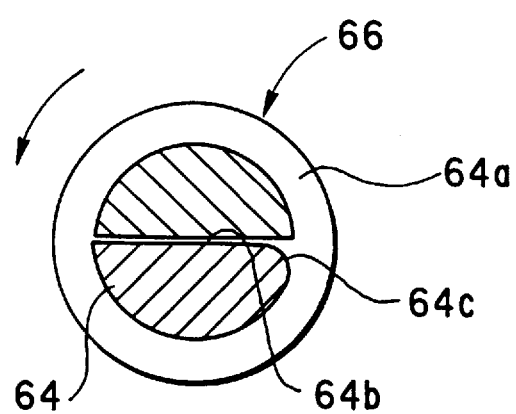
FIG. 15 is a cross section illustrating the same take-up spool.

In the embodiments of FIGS. 10–13, two spool flanges are respectively split into flange halves. Each of core halves is provided with two of the flange halves. However spool flanges 64a and 64b can be formed only with one core half 64 of two, as illustrated in FIGS. 14 and 15, without splitting into flange halves. In a take-up spool 66 of this structure, a curved face 64c is formed by rounding off an edge of a confronted wall 64d of the core half 64. It is to be noted that any of the take-up spools in FIGS. 10–15 has respectively the two spool flanges. The present invention is applicable to a take-up spool without flanges. However those take-up spools as depicted are advantageous in that end faces of the roll 26a can be regulated neatly while wound. This is convenient in containing into the roll chamber 27.

Note that the present invention is applicable to a camera which is re-loadable with photo films. The camera can be provided with the take-up spools 28, 55, 60 and 66, which are usable for taking up photo film as loaded therein. In the above embodiments, the take-up spools 28, 55, 60 and 66 are respectively incorporated in the roll chamber 27. The present invention is applicable to a lens-fitted photo film unit without any take-up spool, with the roll 26a contained in the roll chamber 27. In a factory for the production, a photo film take-up shaft is used for forming the roll 26a among devices for producing the lens-fitted photo film unit. The forks 29 and 30 can be eliminated from the rear cover 19.

Figure 16:
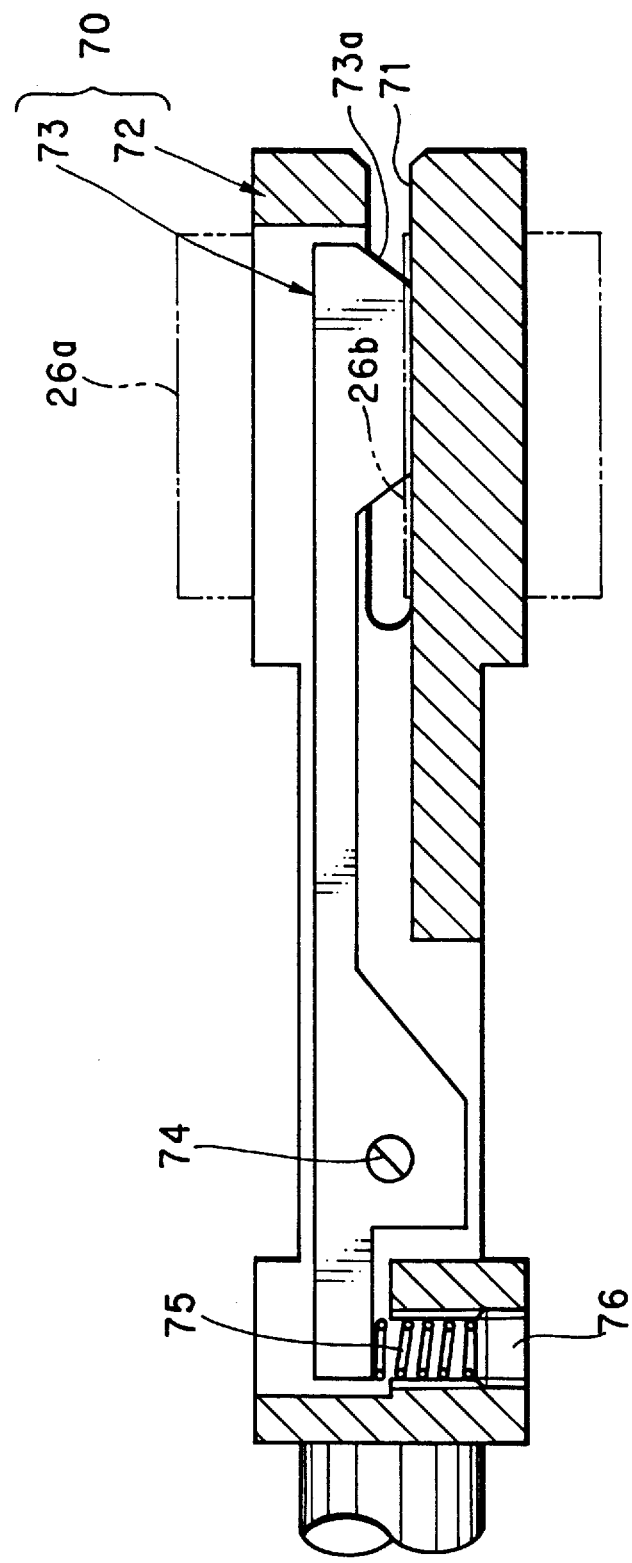
FIG. 16 is a longitudinal section illustrating a photo film take-up shaft for production of a lens-fitted photo film unit.
Figure 17:
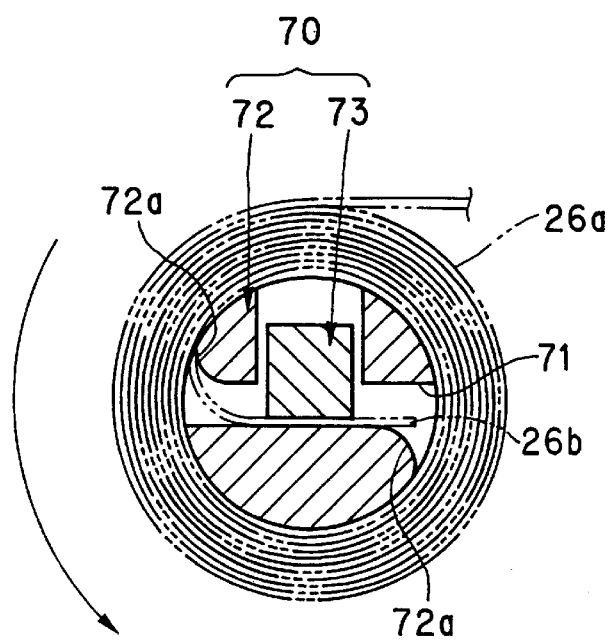
FIG. 17 is a cross section illustrating the same take-up shaft with a photo film roll.

As illustrated in FIGS. 16 and 17, a take-up shaft 70 as a jig includes a shaft body 72 and a nip rod 73. The shaft body 72 has a take-up slot 71 formed openly at a distal end of the shaft body 72, axially extended, and cut along a diameter of the shaft body 72. The nip rod 73 is disposed on the shaft body 72, and nips the leader 26b between it and a confronted wall of the take-up slot 71. The nip rod 73 is swingable about an axis 74 in the nip position and a release position away from the wall of the take-up slot 71 to make the leader 26b free. The nip rod 73 is biased by a spring 75 to the nip position.

As depicted in FIG. 17 in detail, two curved faces 72a are formed by rounding off edges of the take-up slot 71 of the shaft body 72. The curved faces 72a are arranged in rotationally symmetrical fashion with reference to an axis of the take-up slot 71. It is possible to select either one of two entrances of the take-up slot 71 for entry of the leader 26b. Either of the curved faces 72a can receive a surface of the leader 26b with gentle curvature when the take-up shaft 70 is rotated in the winding direction indicated by the arrow.

To insert the leader 26b into the take-up shaft 70, the nip rod 73 is swung toward the release position by manual operation. When the nip rod 73 is released from the manual operation, the spring 75 swings the nip rod 73 toward the nip position in turn. Note that it is possible for slide of the leader 26b to swing the nip rod 73 toward the release position without manual operation. For this, the leader 26b is pressed against an inclined face 73a in insertion through the take-up slot 71, to swing the nip rod 73 away from the nip position.

Then the take-up shaft 70 is rotated in the winding direction to form the roll 26a thereabout. For this, rotation of the motor 42 is transmitted to the shaft body 72, as described by referring to FIG. 4. For the cassette spool 35 in the cassette shell 24, the speed reducing shaft 44 is used to produce the roll 26a with tightness between the turns.

The roll 26a about the take-up shaft 70 is inserted into the roll chamber 27. Afterwards the take-up shaft 70 is moved away from the roll chamber 27. The nip rod 73 is rotated to the release position in the movement of the take-up shaft 70. The leader 26b having lain in the take-up slot 71 is contained in the roll chamber 27 with the roll 26a. It is to be noted that operation of forming the roll 26a can be effected inside the roll chamber 27. With this variant operation, the cassette shell 24 may be contained in the cassette containing chamber 25 while the roll 26a is formed. In the embodiment of FIGS. 16 and 17, force of nipping the leader 26b is adjustable by rotating an adjustor screw 76, or by replacing the spring 75 with another having different force.

Figure 20:
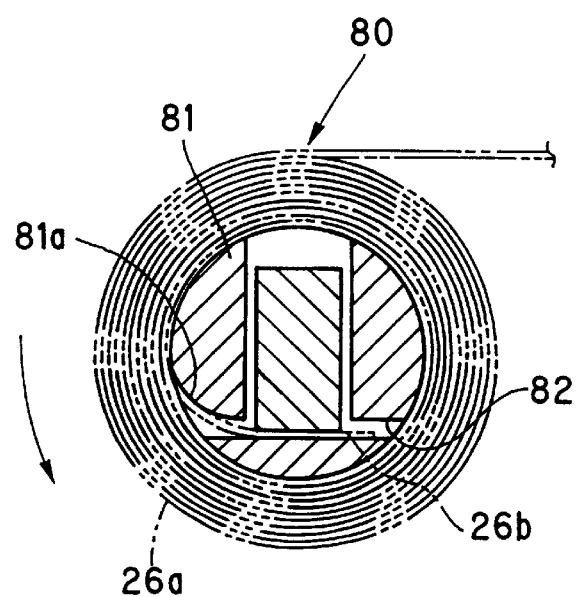
FIG. 20 is a cross section illustrating the same take-up shaft.
Figure 18:
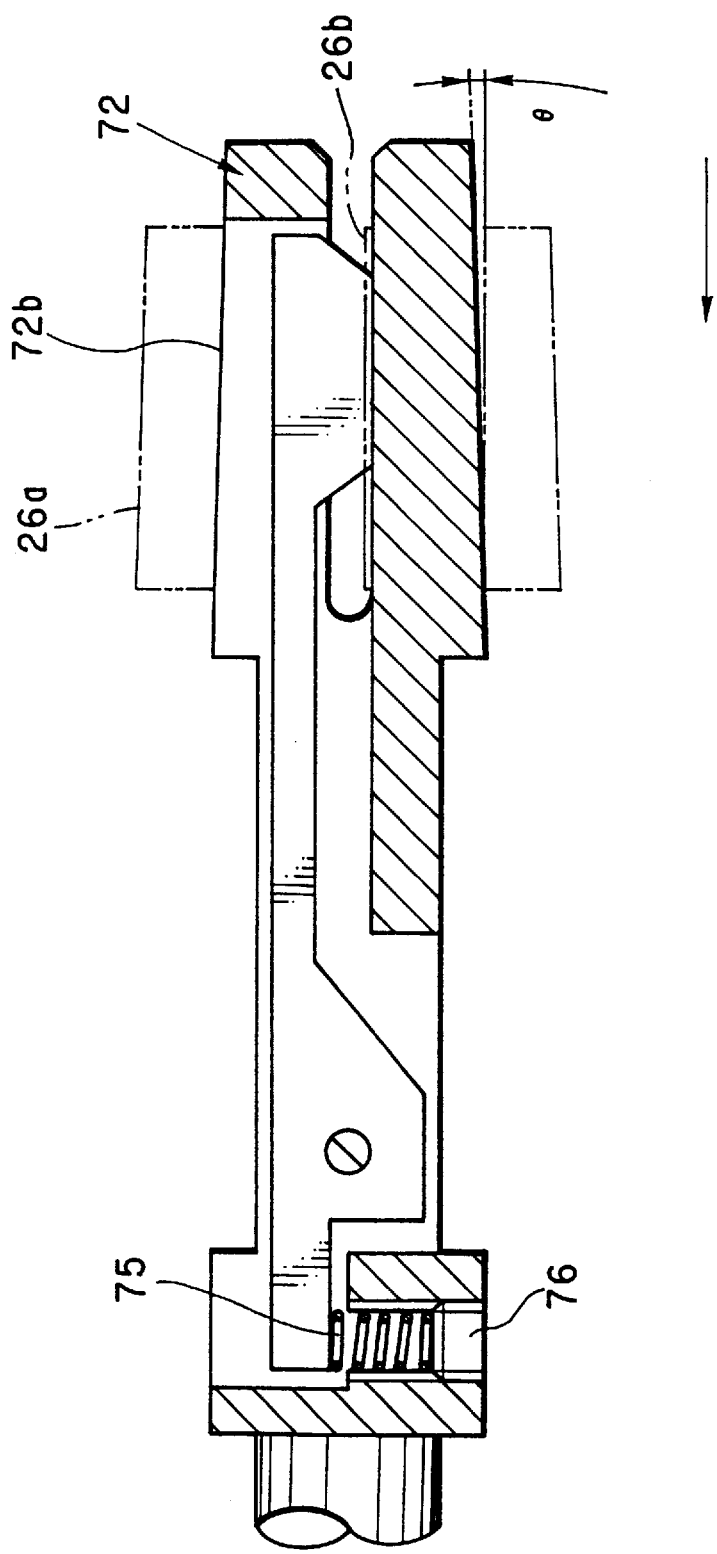
FIG. 18 is a longitudinal section illustrating another preferred take-up shaft having an inclined face.
Figure 19:
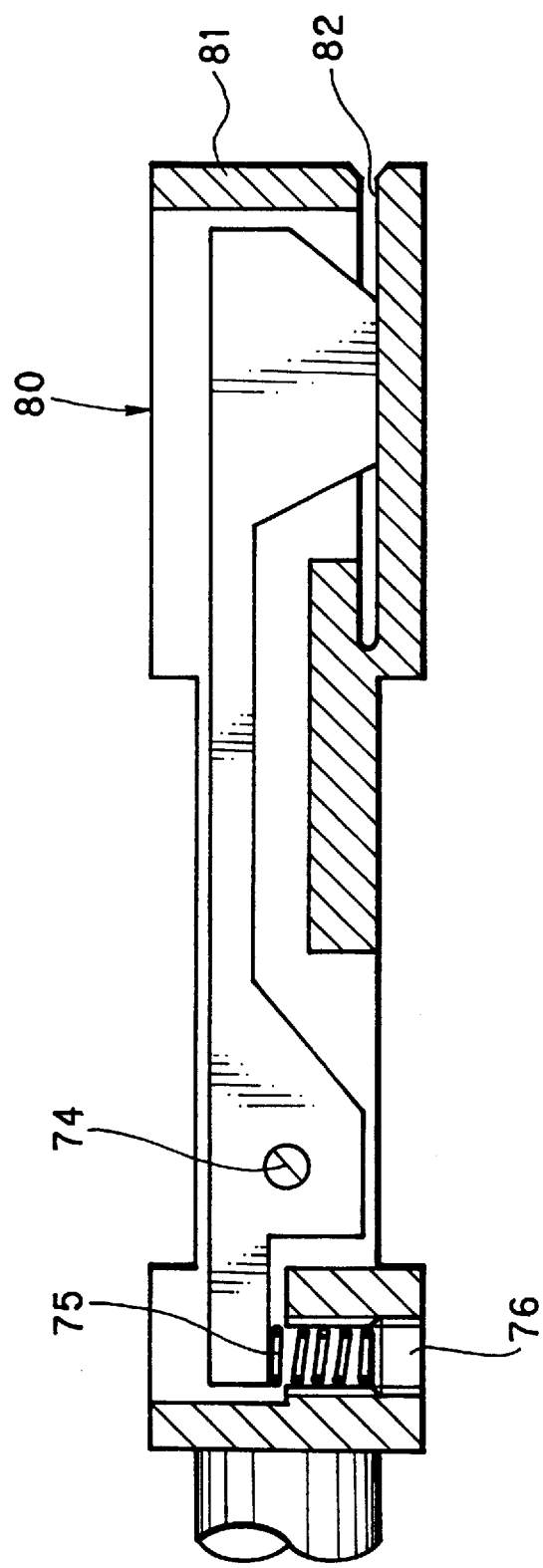
FIG. 19 is a longitudinal section illustrating still another preferred take-up shaft in which a take-up slot is eccentric.

In removal of the roll 26a from the take-up shaft 70, the inner turns are difficult to remove unlike the outer turns, because of the operation of tightening the roll 26a. It is preferable as illustrated in FIG. 18 to form an inclined face 72b at an angle $\theta$ about the shaft body 72 decreasingly in diameter toward the distal end, for the purpose of facilitating the removal. In FIGS. 19 and 20, a take-up shaft 80 can have a take-up slot 82 eccentric with reference to an axis of a shaft body 81. A curved face 81a are formed by rounding off an edge of the shaft body 81 of the take-up slot 82.

In the take-up shafts 70 and 80 of FIGS. 16–20, the leader 26b is nipped by the bias of the spring. Alternatively a proximal end of the nip rod 73 may be fixedly retained in a take-up shaft, and resiliency of the nip rod 73 itself may nip the leader 26b. Also the nip rod 73 may be formed integrally with the shaft bodies 72 and 81.

In the above embodiments, the leader 26b does not have any perforations. The present invention, however, is applicable to photo film of which a leader has perforations. In the above embodiments, the leader 26b is advanced to the outside when the cassette spool is rotated in the unwinding direction. The present invention, however, is applicable to a construction in use with a 135-type of photo film cassette, of which a leader is previously protruded from a cassette shell. In the above, the take-up spool and shaft are used simply with lens-fitted photo film units. The present invention is also applicable to a spool contained in a photo film cassette in rotatable fashion.

In the above embodiment, the curved faces 46c, 53c, 57b, 62b, 64c, 72a and 81a have the radius of curvature 0.4–0.85 time as long as a radius of the core or the shaft body. The present invention is applicable to a take-up spool or take-up shaft having at least one curved face having any radius of curvature relative to the radius of a core or a shaft body.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A take-up shaft for production of a lens-fitted photo film unit, said lens-fitted photo film unit having a cassette containing chamber and a roll chamber between which an exposure aperture is located, said cassette containing chamber containing a cassette; said cassette having unexposed photo film, said photo film being drawn from said cassette before loading into said lens-fitted photo film unit; a leader of said photo film being secured to said take-up shaft which is rotated to wind said photo film thereabout in a form of a photo film roll, said take-up shaft being inserted in said roll chamber to insert said photo film roll, said take-up shaft comprising:

a shaft body having a cylindrical shape;

a nip device for nipping said leader in removable fashion, inside said shaft body; and at least one curved face, formed between an inside surface of said shaft body and a cylindrical face of said shaft body and at a radius of curvature 0.4–0.85 time as long as a radius of said shaft body, for preventing said leader secured to said shaft body from being sharply bent, wherein said shaft body has a take-up slot formed therein for insertion of said leader, said take-up slot having first and second walls, said curved face being formed in connection to at least said second wall of said take-up slot; said take-up slot being so eccentric with reference to said shaft body as to form said second wall thicker than said first wall, to facilitate lengthening said radius of curvature of said curved face relatively;

wherein said shaft body also has an auxiliary slot formed through said first wall to communicate with said take-up slot; and wherein said nip device includes:

a nip rod disposed in said auxiliary slot, said nip rod having first and second ends, said first end being disposed in said take-up slot for causing said first end to nip said leader;

an axis for supporting said nip rod in a swingable manner between said first and second ends;

a spring for biasing said second end to push said first end on to said second wall; and an adjustor screw movable in a direction of bias of said spring for adjusting said bias of said spring, said spring being disposed between said adjustor screw and said second end.

2. A take-up shaft as defined in claim 1, wherein said photo film includes a support formed of annealed polyethylene naphthalate (A-PEN).

3. A take-up shaft as defined in claim 1, wherein a cylindrical face of said shaft body is inclined to decrease a diameter thereof toward a distal end.

4. A take-up shaft as defined in claim 1, wherein said photo film includes a trailer associated with said cassette and an exposure effective area defined between said leader and said trailer, a pattern of perforations is formed along said exposure effective area, and at least one perforation included in said pattern is respectively associated with one frame to be formed on said photo film.

5. A take-up shaft for taking up photo film from a photo film cassette having said photo film, said photo film cassette including a cassette spool on which said photo film is wound in a roll form; a cassette shell for containing said cassette spool in rotatable fashion; and a leader-advancing device, operable while said photo film is entirely contained in said cassette, for advancing a leader of said photo film to an outside of said cassette when said cassette spool is rotated in a direction of unwinding said photo film; said take-up shaft comprising: a shaft body having a cylindrical shape;

a nip device, disposed inside said shaft body, for nipping said leader in removable fashion, said shaft body being rotated with said leader, to wind said photo film in a roll form; and at least one curved face, formed between [said] an inside surface of said shaft body and a cylindrical face of said shaft body and at a radius of curvature 0.4-0.85 time as long as a radius of said shaft body, for preventing said leader secured to said shaft body from being sharply bent, wherein said shaft body has a take-up slot formed therein for insertion of said leader, said take-up slot having first and second walls, said curved face being formed in connection to at least said first wall of said take-up slot; said take-up slot being so eccentric with reference to said shaft body as to form said first wall thicker than said second wall, to facilitate lengthening said radius of curvature of said curved face relatively:

wherein said shaft body also has an auxiliary slot formed through said first wall to communicate with said take-up slot; and wherein said nip device includes:

a nip rod disposed in said auxiliary slot and extending toward said distal end of said shaft body, said nip rod being supported in said auxiliary slot in pivotable fashion, and;

a nip rod disposed in said auxiliary slot, said nip rod having first and second ends, said first end being disposed in said take-up slot for causing said first end to nip said leader;

an axis for supporting said nip rod in a swingable manner between said first and second ends;

a spring for biasing said second end to push said first end on to said second wall; and an adjustor screw movable in a direction of bias of said spring for adjusting said bias of said spring, said spring being disposed between said adjustor screw and said second end.

6. A take-up shaft for a lens-fitted photo film unit, said lens-fitted photo film unit having a cassette containing chamber and a roll chamber between which an exposure aperture is located, said cassette containing chamber containing a cassette, said take-up device being disposed in said roll chamber in rotatable fashion, a leader of said photo film being secured to said take-up device about which said photo film is wound in a form of a photo film roll, said take-up device comprising:

a core having a cylindrical shape;

a nip device for nipping said leader in removable fashion; and at least one curved face, formed between an inside surface of said core and a cylindrical face of said core and at a radius of curvature 0.4–0.85 time as long as a radius of said core, for preventing said leader secured to said shaft body from being sharply bent, wherein said core has a take-up slot formed therein for insertion of said leader, said take-up slot having first and second walls, said curved face being formed in connection to at least said second wall of said take-up slot; said take-up slot being so eccentric with reference to said core as to form said second wall thicker than said first wall, to facilitate lengthening said radius of curvature of said curved face relatively;

wherein said core also has an auxiliary slot formed through said first wall to communicate with said take-up slot; and wherein said nip device includes:

a nip rod disposed in said auxiliary slot, said nip rod having first and second ends, said first end being disposed in said take-up slot for causing said first end to nip said leader;

an axis for supporting said nip rod in a swingable manner between said first and second ends;

a spring for biasing said second end to push said first end on to said second wall; and an adjustor screw movable in a direction of bias of said spring for adjusting said bias of said spring, said spring being disposed between said adjustor screw and said second end.

* * * * *